Jan. 23, 1962 J. W. BECK 3,018,387

NON-SATURATING TRANSISTOR CIRCUIT

Filed Feb. 4, 1957

INVENTOR.
JOHN W. BECK

BY Lippincott + Smith

ATTORNEYS 3,018,387

NON-SATURATING TRANSISTOR CIRCUIT

John W. Beck, Santa Clara, Calif., assignor to International Business Machines Corporation, New York, N.Y., a corporation of New York Filed Feb. 4, 1957, Ser. No. 638,099
9 Claims. (Cl. 307—88.5)

Figure 1:
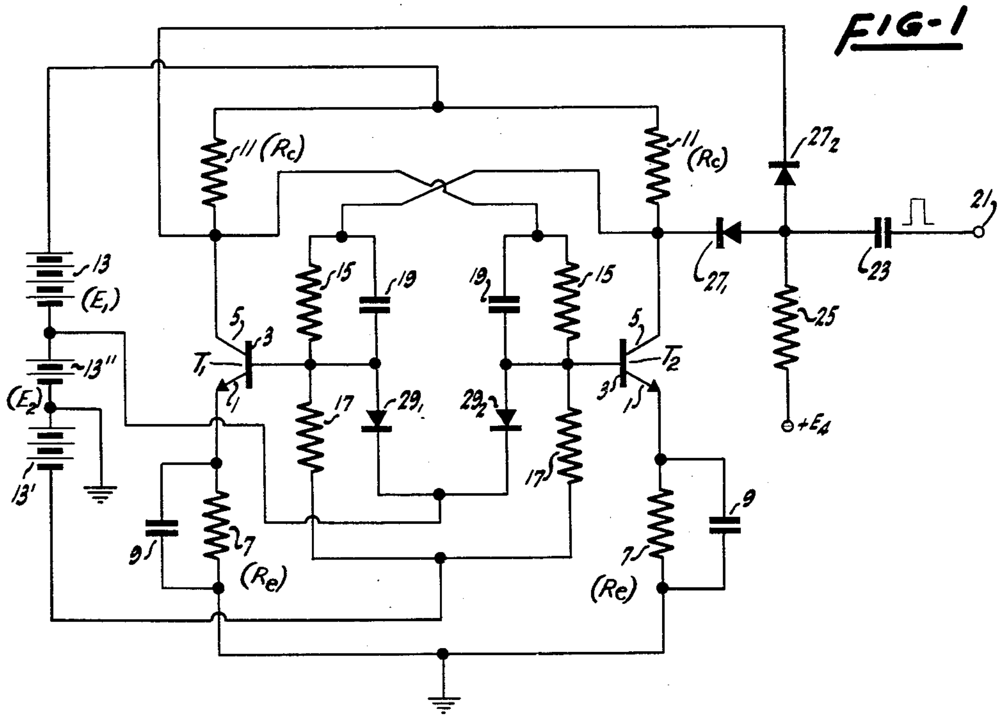

This invention relates to circuits wherein transistors are used as the amplifying elements upon which the operation of the circuit depends. Specifically, it relates to circuits employing positive feed-back which causes a change of condition, once started, to continue in the same direction until brought to a halt by an inability of the amplifying element to respond further to controls tending to produce the change. Such inability to respond may result from the inherent characteristics of the amplifier itself or from limiters of various types incorporated in the circuit. The effect is common to all electronic oscillators, including in the latter term both sine-wave oscillators and relaxation oscillators, such as multivibrators. In circuits of this latter type the effect occurs whether the regenerated impulses inintiating a change are self-generated or applied from an external source. The present invention can be employed in any positive-feedback transistor circuit wherein the gain in the feedback path equals or exceeds unity, but because the difficulties that the invention overcomes are particularly evident in multivibrators the invention will be described in connection with circuits of this type.

As the term is generally understood, a multivibrator circuit is one having two quasi-stable states. It employs two amplifying elements which assume alternately, an "On" state in which it conducts maximum current and an "Off" state of minimum conduction, one element being in the Off and the other in the On state in each of the two quasi-stable conditions of the circuit as a whole. Cross-connections between the amplifying elements are so arranged that when the state of either of the two amplifiers is disturbed, tending to cause a change of state, the change is regenerative, tending to perpetuate itself and carry the change to completion with the positions of the On and Off amplifiers reversed.

Multivibrators in general are classified as bistable, monostable, and astable. Bistable multivibrators require an externally supplied impulse to cause any change of state and are frequently referred to as "flip-flops." In monostable multivibrators an impulse is required to change from one state to the other; it will remain in this second state for an interval depending upon the circuit parameters and then return to its stable state. Astable multivibrators require no external triggering impulse, current flowing in the "On" half of the circuit gradually establishing conditions that upset the temporary equilibrium and initiate a change that causes the circuit as a whole to go into self-sustaining oscillation.

Although as originally conceived vacuum tubes were used as the amplifying elements in such circuits it is now well-known to substitute transistors for this purpose. Where extremely rapid changes of state have been required, however, most transistor multivibrator circuits have proved unsatisfactory. The current flow in the output circuit of a transistor is determined by the number of current carriers available in the base, through which the control current is normally supplied. Under the conditions of maximum current flow a maximum number of such current carriers exists within the base portion of the device.

Bias is supplied to the output or collector circuit through an impedance element. As current flow increases the voltage drop through the impedance element also increases, the potential of the collector with respect to the base approaches zero and the field available to collect the carriers becomes very small. Until the collector potential with respect to the base falls to very near zero in absolute value (it may be either positive or negative, depending upon the type of transistor used) the collector current is very nearly independent of the collector voltage. At zero collector voltage no field exists to collect additional current carriers injected into the base; collector current ceases to rise and an excess of available current carriers exists in the base. In order to effect a change of state from this condition it is necessary to sweep the excess carriers from the base and this introduces a very appreciable lag. If, however, the collector voltage is never permitted to reach zero, but is maintained at a very small absolute value in the proper direction, such lag in response to control current as may continue to exist also becomes very small as compared with that introduced where an excessive number of current carriers is permitted to accumulate in the transistor base. It is such an accumulation of carriers introducing material lag in transition between the two circuit states, that is referred to as "carrier saturation."

Because of the mutually regenerative cross-connections between the transistors in a circuit of this character, once a transition has been started it tends to go to completion and since, in the "On" state, completion necessarily means maximum available carriers and minimum collector voltage, carrier saturation always occurs in multivibrator circuits of the conventional type, whether bistable, monostable, or astable.

The primary object of the present invention is to provide a transistor circuit that is capable of higher response rates than is possible in circuit configurations where carrier saturation can occur, particularly in multivibrator circuits. Other objects of the invention are to provide a circuit the performance of which is less dependent upon temperature conditions than those of conventional type, one wherein operation is less dependent upon the characteristics of the individual transistors used, thus promoting interchangeability, and one wherein an ultimate output circuit of low impedance is available and hence minimizing the effects of stray capacitances which would tend to lengthen the rise-times of pulses generated by the device. Features of the invention, in attaining these ends, are the provision of a circuit wherein carrier saturation cannot occur and the provision of a circuit wherein transition between quasi-stable states is brought to a halt on the linear portion of the characteristic curve of the device, where the collector potential with respect to the base is maintained at all times sufficiently above zero value to prevent saturation occurring.

A characteristic multivibrator circuit employs the so-called "common emitter" connection, wherein the emitter forms a part of both the base and emitter circuits. Each collector is connected to a point of reference potential, hereinafter referred to as ground, through an impedance element. Each collector connects to a source of biasing potential that is relatively high in absolute value with respect to ground, through another impedance element of higher value than that connected in the emitter circuit. If the transistor is of the n-p-n type the biasing source will be positive with respect to ground, while if of the p-n-p type it will be negative. For convenience it will be assumed throughout what follows that the transistors used are of the n-p-n type and the values of potential applied will be described accordingly, but it is to be remembered that p-n-p transistors can also be employed by simply reversing the polarities of the biasing sources and other unilateral instrumentalities mentioned.

The control currents to each of the bases are derived from a voltage-divider network having one end connected to the collector of the opposite transistor, the other end connected to ground through a negative potential source. The impedances in the two arms of the voltage divider are so chosen that when the collector at which the divider terminates is carrying current its potential is reduced and therefore the potential of the junction to which the base of the controlled ransistor is connected is reduced proportionally, to a value that substantially cuts off current flow to the other collector. As the current through one transistor increases the other decreases, as due to the cross-connection there are mutual feedbacks which speed up the action until the transition is stopped by the two transistors reaching the limits of their operating ranges. Various additional circuit elements may be added to speed up the action, to provide for either external triggering for bistable multivibrators or self-triggering for other types, but the essential operation is either that described or some modification which fulfills like functions. In general, however, what brings the transition to a halt and establishes the new state is one or both of two situations; either the high potential end of the voltage divider has been carried as far toward the potential of the biasing source for the collector as it can go or the collector of the "On" tube has fallen to zero potential with respect to the base, setting up the carrier saturation situation above referred to. If minimum current in the collector circuit were zero it might be possible to adjust the potentials across the voltage divider so that it would be the fact that the collector of the "Off' transistor has reached the bias potential that brought the action to a halt. In practice, however, some current always flows, causing some drop in the impedance of the collector circuit. Furthermore, the amount of the minimum current varies markedly with temperature so that the maximum voltage point is indeterminate to some degree, and there is almost always some difference in the characteristics of the two transistors, however carefully they may have been matched. This method of bringing the transition to an end cannot therefore be relied upon to give reproducible, stable results.

In accordance with the present invention the base of a transistor that would otherwise be subject to carrier saturation due to regeneration in its connected circuit is connected to the emitter circuit through a rectifier arrangement that normally prevents current flow but conducts and prevents further voltage rise before the collector falls to base potential. The preferred arrangement comprises a rectifier so poled as to conduct when the relative potentials of the base and the emitter are in the direction causing conduction through the transistor, and hence tending to short-circuit the base. This short circuiting action is opposed by a source of potential connected in series with the rectifier, its voltage being applied to the rectifier in its nonconducting direction and of the maximum value that the base can be permitted to assume without causing carrier saturation. This source supplies no base current at any time, but when the base voltage tends to rise above that of the source and hence to a value that would permit saturation current to flow, it effectively shorts out any further increase of base current and brings the regenerative action to a halt before saturation can occur. An alternative is a Zener diode, connected normally to prevent current flow, that breaks down and conducts at a definite voltage less than that causing carrier saturation.

Figure 2:
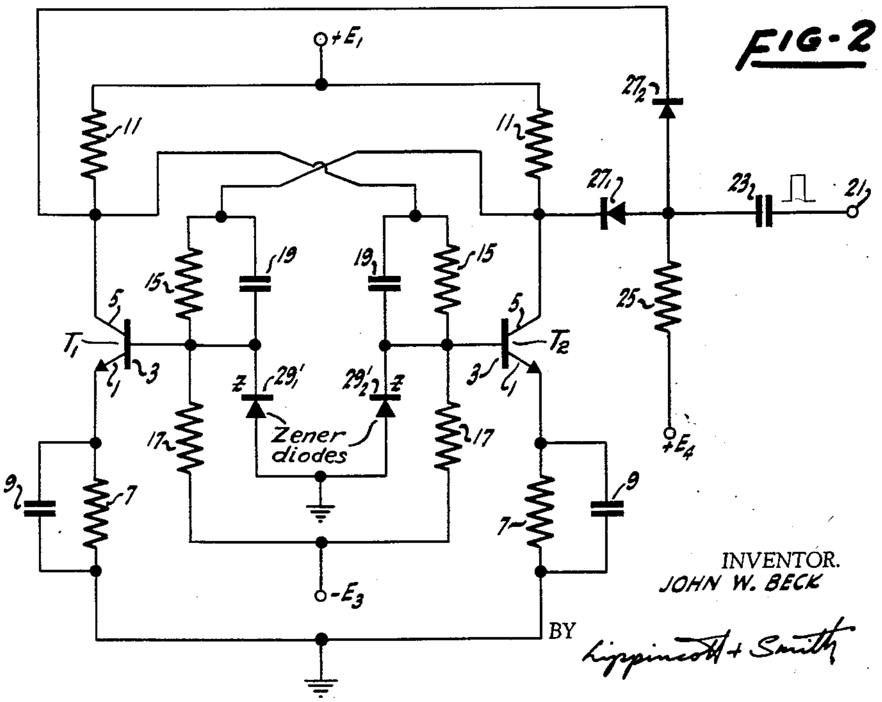

In the drawings:

FIG. 1 is a schematic diagram illustrative of a preferred form of the invention, employing a reverse-biased rectifier; and FIG. 2 is a similar diagram employing a Zener diode for the same purpose.

The basic circuit shown in FIG. 1 is that of a well-known type of bistable multivibrator employing two n-p-n transistors $T_1$ and $T_2$, each having an emitter 1, a base 3, and a collector 5. However, each emitter is connected to ground through a resistor 7, these resistors being bridged by condensers 9, which serve to facilitate the switching operation. The collectors 5 connect through resistors 11 to the positive terminal of a common potential source 13, the negative end of which connects to ground. The circuit is symmetrical, and hence there is generally no need to distinguish between the connections to the two transistors. In a few cases where it is convenient to distinguish, the subscripts 1 and 2 are used to describe a relationship to one or the other of the transistors $T_1$ or $T_2$, but in the general description the subscripts will be ignored, mention of a reference character without subscript referring equally to the corresponding circuit elements on both sides of the circuit.

A voltage divider, comprising resistors 15 and 17 in series, connects from the collector terminal of each of the transistors to the negative terminal of the source through a potential source 13' whose positive pole is connected to ground. The junction between resistors 15 and 17 of each voltage divider connects to the base 3 of the other transistor than that to which the high potential end of the respective voltage divider is connected. Small condensers 19 are bridged across arms 15 of each of the voltage dividers, as is usual in multivibrator circuits of this type.

Triggering pulses for initiating the changes of state of the circuit are applied from a terminal 21 through a blocking condenser 23. The triggering circuit is itself conventional. In the present case the circuit is intended to be triggered by positive pulses, these pulses, after passing through the blocking condenser 23, appearing across the resistor 25, biased with respect to ground by a source not shown. The junction of condenser 23 and resistor 25 connects through rectifiers 27, poled to pass the positive pulses, to the collectors of the two transistors. The bias applied to resistor 25 is high enough so that the bias voltage plus the pulse voltage is less than the voltage of the source 13, but greater than the voltage appearing on the collectors of the transistors when in the "On" state. The pulses are therefore transmitted through the rectifier to which this lower voltage is applied and thence through the corresponding voltage divider to the base of the "Off" transistor, causing it to start to carry current and initiating the transition which is carried to completion through the regenerative connection.

In accordance with the present invention, the circuit is modified further by the addition of a rectifier $29_1$ connected to the base of transistor $T_1$ and $29_2$, similarly connected to transistor $T_2$. These rectifiers connect to ground through a potential source 13'' which may be either a separate source or may form a portion of the source 13 through which the two collectors are supplied with current. The rectifiers 29 are poled to carry current from the source 13 to ground through resistors 11, 15, and the source 13'. As long as the voltage from 13'' is greater than that of the base of the transistor to which the rectifier connects, no current can flow through this path, but if the potential applied to the transistor base exceeds that of source 13'' the rectifier acts as an effective short-circuit, which prevents further rise in voltage of the base. The potential of the source 13'' is so chosen that this will occur before the potential of the collector 5 drops to zero with respect to the base.

Maximum output from the device will be achieved when the difference between the two voltages, as expressed above, is just sufficient to bring the maximum current carried by the "On" transistor below the knee of its characteristic curve, thus bringing the regenerative process to a halt independently of the inherent characteristics of the transistor itself. Moreover its does this before the "Off" transistor has reached its minimum-current state. As the minimum current is always finite, and increases with temperature, the cut-off point can be so selected as to occur when maximum-temperature cut-off current is flowing in the "Off" transistor, the value of the negative voltage of the source 13' can be somewhat less than would be required to cause effective cut-off at lower temperatures.

To determine the voltage $E_2$ to be applied from the source 13'', call the resistance of the element 7, $R_e$, that of element 11, $R_c$, the total voltage of the source 13 with respect to ground, $E_1$ and that of the source 13'', call $E_2$.

Assuming that the same current flows through resistors 7 and 11, the potential between collector and base can never drop to zero as long as $E_1$ is greater than $$E_2\frac{R_c}{R_e}$$

in absolute value, both $E_1$ and $E_2$ being of the same polarity with respect to ground. Otherwise stated, $$E_2+\Delta E=E_1\frac{R_e}{R_c}$$

Actually the curent through resistor 7 will be slightly greater than that through resistor 11, tending to raise the potential of the base somewhat nearer to that of the collector than the equal-current assumption would warrant. There is, however, a voltage drop through each of the junctions of the transistor, and it comes out that the inequality referred to above is adequate to define the conditions for satisfactory operation and the amount of the inequality $\Delta E$ may be very small. The arrangement controls, simultaneously, both maximum and minimum currents delivered by the transistors, insuring that they operate at all times on the steepest portions of their characteristic curves where they can rspond most quickly and effectively to control.

Differences in transistor characteristics have in general the same effects on their performance as have differences in temperature on a single transistor. It will be seen that with the criteria here given for the values of the voltages $E_1$ and $E_2$ the characteristics of the individual transistor do not enter. It follows that there is a wider choice available in selecting transistors for use in a given piece of equipment; the transistors do not have to be so carefully matched in order to produce consistent results in a given piece of equipment.

It will be noted that no output connections are indicated in the drawing. The output impulses from the circuit can be taken either across one of the resistors 11 or across one of the resistors 7. The former will provide a relatively high output impedance where this is desired. Taking the output across one of the resistances 7 in the emitter circuit of one or both of the emitter circuits gives low output impedance where this is desired.

FIG. 2 is substantially similar to FIG. 1 except for the connection of the diodes $29'_1$ and $29'_2$ and the potential sources are not shown. The diodes $29'_1$ and $29'_2$ are reversed in polarity with respect to those shown in FIG. 1; i.e., they are normally non-conductive when the transistor bases are positive with respect to ground. They are, however, "Zener" or voltage regulating diodes so chosen that they break down and carry so-called "avalanches" currents when the voltage across theme exceeds a definite limiting value, the "Zener voltage."

The Zener voltage can be regulated to a considerable degree of accuracy in the design and construction of diodes of this character. The diodes here used are so chosen that this voltage is equal in value to $E_2$ in the inequality above given that expresses this value. The reason for preferring the embodiment of FIG. 1 is that it is completely independent of the characteristics of the diodes used. While it is obvious that such minor differences in Zener voltage as may exist between nominally identical diodes can be compensated by applying a small bias, positive or negative, to correct the deviation from a desired value it is usually more economical if a bias is to be used, to employ a simple rectifying diode.

It is emphasized that although the drawings indicate the voltages $E_1$ and $E_2$ as positive this showing is predicated upon the assumption that the two transistors are of the n-p-n type. If p-n-p type transistors are used $E_1$ and $E_2$ will be negative with respect to ground and $E_3$ positive. Rectifiers 29 will in this case be reversed but otherwise the circuit will be identical. Voltages $E_1$ and $E_2$ will always be of the same sign and it is the difference in the absolute magnitude of their ratios that is important, the sign of that difference being positive with n-p-n transistors and negative with p-n-p transistors.

It will be recognized that many circuits have been devised employing different ways of applying regenerative feedback to an amplifying element in such manner that if that element is a transistor the feedback can lead to carrier saturation. Certain of these circuits do not employ resistors in series with the emitters of any transistors employed, in which case the criterion for the value of $E_2$ as given here does not apply. With any such circuit there are design criteria whereby the relative values of the potentials on the collector and the base can be determined for a given value of voltage from the biasing source and if this is known there can be derived a maximum value of voltage to which the base can rise without becoming equal to the collector voltage and thus causing carrier saturation. If the voltage of the source $E_2$ is made equal to or less than the critical value saturation will always be prevented.

The application of the invention to an otherwise unchanged multivibrator circuit will raise the maximum frequency to which it can respond by an order of magnitude or more in addition to making its performance independent of such changes in operating temperature as are normally to be expected. With bistable multivibrators this speeding up of response means a corresponding increase in resolving power or counting rate. The effect of the invention on monostable or astable multivibrators is substantially the same. Other types of oscillators are similarly improved in regard to the frequencies which they will generate or to which they will respond. The particular form of circuit herein described is therefore merely illustrative of many circuits wherein the invention may be embodied, the scope of the invention being defined by the claims which follow.

I claim:

1. In a circuit employing a transistor having an emitter, a base and a collector and wherein positive feedback tends to cause carrier-saturation of said transistor at one phase of its operation, means for preventing such carrier-saturation comprising a rectifier connected between said base and emitter and poled to conduct from said base control currents flowing to said base in the direction that tends to cause increased conduction by said transistor, and a potential source connected in series with the rectifier and a point of fixed potential to bias said rectifier to prevent current flow therethrough until the potential of said base approaches a value that would cause carrier saturation.

2. In a circuit employing a transistor having an emitter, a base and a collector, said base and collector being biased respectively to voltages progressively higher in absolute value with respect to said emitter, said circuit including positive feedback connections tending to cause carrier saturation of said transistor at a phase of operation of said circuit whereat it is carrying maximum current, means to supply control currents to the transistor base, means for preventing carrier saturation comprising a rectifier connected between said base and said emitter and so poled as to short-circuit the supplied control currents that would tend to increase conduction by said transistor, and a source of potential connected in series with said rectifier between said base and said emitter and of a polarity opposing conduction by said rectifier and of a value substantially equal to the maximum voltage that can be applied to said base without causing current saturation.

3. In a multivibrator circuit employing a pair of transistors, each having an emitter, a base and a collector, impedance elements in series with each of said emitters and said collectors, a source of operating voltage connecting through said respective impedance elements to a point of reference potential, and cross-connections connecting from the collector of one transistor of said pair of transistors to the base of the other transistor of said pair of transistors, a voltage divider including a pair of series-connected resistor elements in each of said cross-connections, each voltage divider having a connection so that the voltage produced at the junction point of the two said connected series resistors by current flow therethrough, due to the transistor whose collector is connected to one end of the voltage divider, is supplied to the base of the other transistor means for preventing carrier saturation of said transistors comprising a pair of rectifiers connected respectively to the base of each of said transistors and poled to conduct away from said base current supplied thereto from said voltage dividers, and a potential source connected in series with each of said rectifiers to prevent conduction thereby until the potential of said base exceeds that of said potential source.

4. In a multivibrator circuit employing a pair of transistors each having an emitter, a base and a collector, a pair of resistors each of value $R_e$ connected from a common connection at a zero reference voltage to the emitters of respective ones of said transistors, a source of a voltage $E_1$ with respect to said reference voltage, a pair of resistors each of value $R_c$ connected from the collector of respective ones of said transistors to said $E_1$ voltage source, and a voltage divider connected from the collectors of each of said transistors respectively to provide a current path back to said point of reference voltage and having an intermediate point thereon connected to the base of the other of said transistors, means for preventing carrier saturation of said transistors comprising a rectifier connected to the base of each of said transistors and so poled as to conduct current between said source and said point of reference potential, and a second source of potential of voltage $E_2$ connected in series with each of said rectifiers to oppose flow of current therethrough, the ratio of voltages of said sources being such that $E_1$ is greater than $$E_2\frac{R_c}{R_e}$$

in absolute value.

5. The invention as defined in claim 4 wherein the difference between $E_1$ and $$E_2\frac{R_c}{R_e}$$

is greater than but approaches zero.

6. In a circuit employing a transistor having an emitter, a base, and a collector, and wherein positive feedback tends to cause carrier-saturation of said transistor at one phase of its operation, means for establishing operating potentials at the transistor-emitter base and collector, means for preventing such carrier-saturation comprising a circuit connecting said base to a point of fixed potential and voltage regulating means in said circuit for preventing current flow therein until said base approaches the potential of said collector, said voltage-regulating means comprising a rectifier and biasing means in series therewith poled to oppose conduction by said rectifier.

7. A transistor circuit comprising a transistor having an emitter, a base, and a collector, first and second fixed-potential terminals, a first resistor connected between said emitter and said first fixed-potential terminal, a second resistor connected between said collector and said second fixed potential terminal, connections for supplying a variable potential to said base for varying the current at said collector, and voltage-limiting means also connected to said base for limiting said variable potential, said voltage-limiting means being normally non-conductive and becoming conductive on the voltage effective upon said base as said collector voltage approaches zero relative to the base, whereby the voltage difference between the collector and base is prevented from reaching zero and carrier-saturation of said transistor is avoided.

8. A circuit as in claim 7, wherein said voltage-limiting means comprises a third fixed-potential terminal having an electric potential between the negative potential of said first terminal and the potential of the second fixed-potential terminal, and a diode rectifier connected between said base and said third fixed-potential terminal, said rectifier being poled to be conductive whenever the voltage between said base and said first fixed-potential terminal exceeds the voltage between said first and third fixed-potential terminals.

9. A circuit as in claim 7, wherein said voltage-limiting means comprises a Zener diode connected between said base and said first fixed-potential terminal.

References Cited in the file of this patent

UNITED STATES PATENTS

| | | |
|---|---|---|
| 2,579,336 | Rack | Dec. 18, 1951 |
| 2,629,834 | Trent | Feb. 24, 1953 |
| 2,673,936 | Harris | Mar. 30, 1954 |
| 2,778,978 | Drew | Jan. 22, 1957 |
| 2,840,728 | Haugk | June 24, 1958 |
| 2,843,761 | Carlson | July 15, 1958 |
| 2,851,220 | Kimes | Sept. 9, 1958 |
| 2,876,366 | Hussey | Mar. 3, 1959 |
| 2,880,330 | Linvill | Mar. 31, 1959 |
| 2,903,604 | Henle | Sept. 8, 1959 |
| 2,903,606 | Curtis | Sept. 8, 1959 |